United States Patent [19]
Brugere et al.

[11] Patent Number: 4,955,652
[45] Date of Patent: Sep. 11, 1990

[54] GRIPPING TOOL FOR A CABLE CONNECTOR PLUG FOR REMOTE MANIPULATION

[75] Inventors: Robert Brugere, Sauzet; Robert Faure, Pierrelatte; Yves Galmard, Orange; Jacques Gerenton, Bourg Saint Andeol, all of France

[73] Assignee: Commissariat A L'Energie Atomique, Paris, France

[21] Appl. No.: 262,620

[22] Filed: Oct. 26, 1988

[30] Foreign Application Priority Data

Oct. 27, 1987 [FR] France .................................. 87 14836

[51] Int. Cl.⁵ .............................................. B25B 5/14
[52] U.S. Cl. ..................................... 294/106; 29/764; 901/39
[58] Field of Search ................... 294/119.1, 106, 110.1, 294/115; 901/31, 32, 36, 39; 439/152, 153, 157; 29/750, 751, 762, 764, 854, 857, 426.1

[56] References Cited

U.S. PATENT DOCUMENTS

| | | | |
|---|---|---|---|
| 3,088,769 | 5/1963 | Richardson | 294/110.1 X |
| 3,425,732 | 2/1969 | Reich | 294/115 |
| 4,327,485 | 5/1982 | Rix | 29/751 |
| 4,599,036 | 7/1986 | Tarbuck | 414/730 |

FOREIGN PATENT DOCUMENTS

| | | | |
|---|---|---|---|
| 3441643 | 5/1986 | Fed. Rep. of Germany | |
| 69152 | 6/1977 | Japan | 294/115 |
| 1337251 | 9/1987 | U.S.S.R. | 294/115 |
| 2589 | 5/1986 | World Int. Prop. O. | |

Primary Examiner—Margaret A. Focarino
Assistant Examiner—Dean Kramer
Attorney, Agent, or Firm—Nilles & Nilles

[57] ABSTRACT

A gripping tool (20) used in particular for the remote handling of connector plugs. The jaws (3) of a remote handled clip (1) chuck clamps (31). An intermediate mechanism (35) ensures the bringing together of two chucking parts (22) and (27) which makes it possible to ensure solid grasping in good conditions of a plug (10). The forces to be exerted for plugging are less significant and are transmitted more effectively.

13 Claims, 4 Drawing Sheets

GRIPPING TOOL FOR A CABLE CONNECTOR PLUG FOR REMOTE MANIPULATION

FIELD OF THE INVENTION

The present invention relates to a gripping tool for a part having a circumferential gripping surface limited by a shoulder and which, in particular, may be a cable connected plug. The invention more particularly concerns remote handling applications.

BACKGROUND OF THE INVENTION

A connector generally comprises two parts: a fixed connector secured, for example, in a wall, and a movable plug which terminates a connecting cable. A locking system is also often provided on the plug: it may consist of a screwing system, with a bayonet or locked by a simple axial translation movement, comprising, for example, retractable ratchets.

In the case of remote handling, the major problem is one of soundly grasping the plug. In the simplest systems, the plugs in effect are merely provided with a circumferential gripping surface which is seized between the jaws of a clip of the remote handler. The clip is then extended slightly perpendicular to the plug, this disposition proving to be somewhat unsatisfactory. In effect, the polarization of the plug, in other words its correct angular positioning opposite the fixed connector, requires that the clip has to perform complicated maneuvers; the clip is still badly placed in order to carry out the axial penetration force which is transmitted by friction forces between the gripping surface and the jaws and which thus requires tight clamping. Finally, the clip is required to be placed against the wall where the fixed connector exists, which may be rendered impossible if it occurs in a recess or amongst other plugs already installed. Moreover, the gripping surface is often badly seized by the jaws, which makes the plug turn during handling and it is thus not brought exactly opposite the fixed connector. This involves additional checking and correction maneuvers.

SUMMARY OF THE INVENTION

The invention makes it possible to overcome these drawbacks by providing a gripping tool between the clip of the remote handler and the part to be plugged in which authorizes both sound grasping of the part and a plugging in by solely almost longitudinal forces, in other words, forces which are the most effective. Thus, greater power of the remote handler is required and in addition the gripping tool slightly withdraws the part from the remote handler and thus is able to accept more severe spatial requirement stresses.

More specially, the invention concerns the gripping tool of a part having a circumferential gripping surface limited by a shoulder, especially for a cable connector plug, wherein it includes a fork overlapping the gripping surface, a lengthening piece opposite a bearing area of the part, a cylindrical body along which slides the lengthening piece, two clamps disposed laterally on both sides of the body, and two mechanisms permitting, under the action of a device, such as a remote handling clip pressing on the two clamps, said clamps to be brought together whilst causing the lengthening piece to slide on the body until the lengthening piece reaches the bearing area of the part and pushes it back, then the shoulder is brought against the fork, the part then being clamped between said fork and lengthening piece.

In one equivalent embodiment, the roles of the fork and the lengthening piece are inverted so that the gripping tool then comprises a fork overlapping the gripping surface, a lengthening piece being opposite a bearing area of the part, a cylindrical body along which slides is the fork, two clamps disposed laterally on both sides of the body, and two mechanisms connecting the fork and the body to two clamps, these mechanisms making it possible, under the action of a device, such as a remote handler clip pressing on the two clamps, to bring together said clamps whilst causing the fork to slide on the body until the fork reaches the shoulder and pushes it back, then the bearing area of the part is brought against the lenthening part, the part then being clamped between the fork and lengthening piece.

Advantageously, the lengthening piece may consist of a hood which arrives to suport the cable fixed at the rear of the plug, and the linking mechanisms may be provided with a recall device allowing them to be brought back into a state where the clamps are distanced from each other and where the part is unclamped.

BRIEF DESCRIPTION OF THE DRAWINGS

A more detailed description of the invention appears below and by referring to the annexed figures, given by way of illustration and being by no means restrictive, and in which.

DETAILED DESCRIPTION OF THE PREFERRED EMOBODIMENTS

Figure 1:
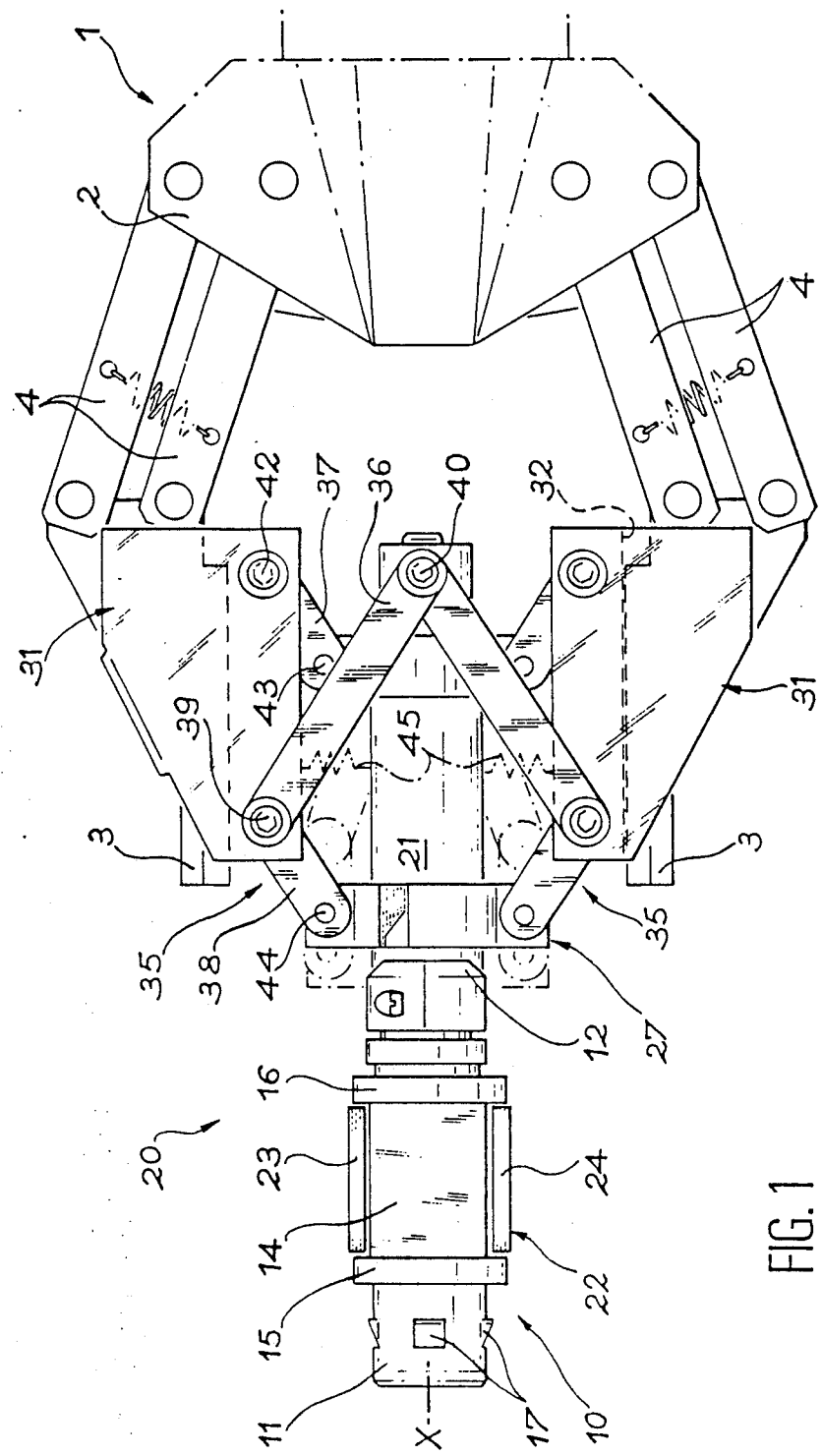
FIG. 1 is a top view of one embodiment of the invention.
Figure 2A:
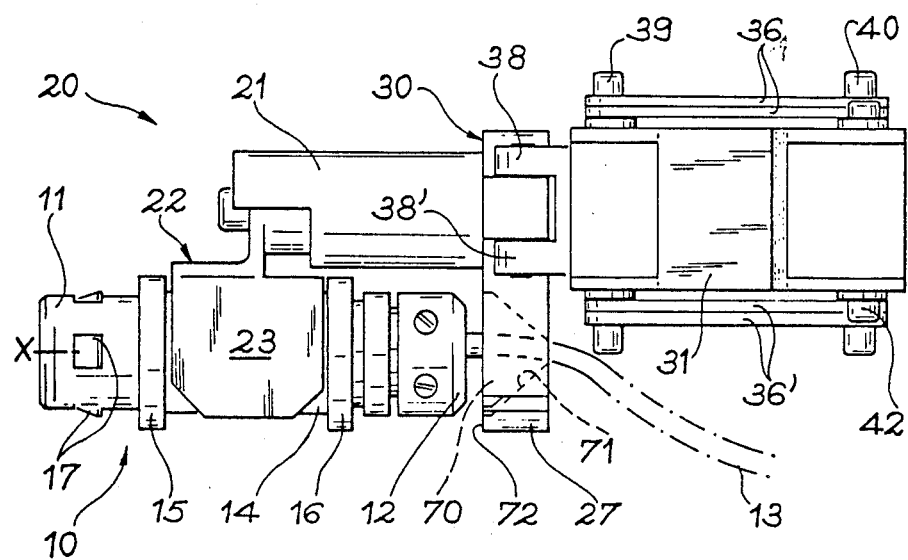
FIG. 2A is a side view of this same embodiment.
Figure 2B:
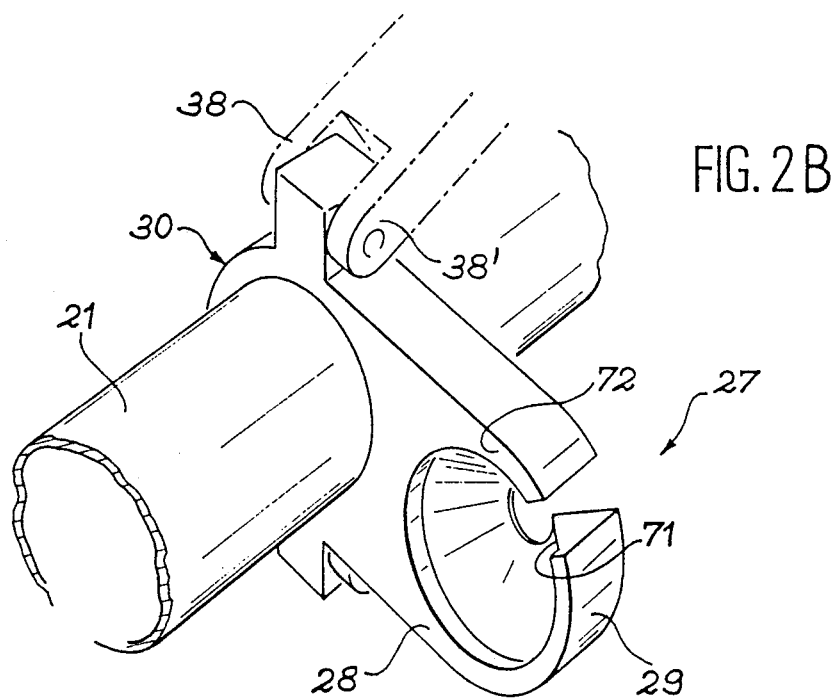
FIG. 2B is a detailed view of this embodiment.

Reference is first made to FIG. 1. The remote handling arm is terminated by a clip 1 comprising a fixed central section 2, two jaws 3 and two pairs of rocker bars 4 each joined onto the central section 2 and onto a respective clamping jaw 3. The hinge pins of the rocker bars 4 are parallel. The two rocker bars 4 joined onto a given clamping jaw 3 remain parallel and their hinge points on the clamping jaws 3 are on a line parallel to the line plotted by their hinge points on the central section 2. This disposition prevents the clamping jaws 3 from turning and thus keeps them parallel. Clamping is effected by rotating the pairs of the rocker bars 4. The clamping jaws 3 then seize the gripping tool 20, which also is shown on FIG. 2, and there now follows a detailed description of the gripping tool shown in a position where it is ready to seize and clamp a connection plug 10. This plug, 10, has a slightly cylindrical form a longitudinal axis X. One of its extremities 11 shown on the left on the drawing corresponds to the section to be plugged into a fixed connector (not shown) and, to its other extremity 12, a flexible cable 13 is hooded which, according to the case, may be electric, pneumatic or hydraulic. The plug 10 also includes between its extremities a roughly cylindrical gripping surface 14, which may be cylindrical generated by rotation or provided with projections prismatic, and which is limited by two front 15 and rear 16 shoulders so as to facilitate its seizing. In many commercial productions, this gripping surface 14 may belong to a ring sliding longitudinally on the plug 10 and whose displacement controls the retraction of the outlets of snugs or ratchets 17 disposed close to the front extremity 11 and which are used for locking it onto the fixed connector.

The gripping tool 20 first of all includes a cylindrical support body 21 whose longitudinal axis is, when in use, parallel to and close to the axis X of the plug 10. The body 21 bears at one extremity a fork 22 constituted by two parallel gripping jaws 23 and 24 extending perpendicular to the axis of the body 21, which are introduced on both sides of the gripping surface 14.

A stop piece 27 (FIG. 2B) in the form of a hood includes a vertical jamb 28 which is prolonged by a lower extremity 29 slightly bent back so as to have a concavity on the side of the jamb 28. The other extremity of the jamb 28 is secured to a bearing 30 which allows the stop piece 27 to slide along the cylindrical body 21. Moreover, the bearing 30 is kept in rotation with respect to the cylindrical body 21 so as to force the jamb 28 to be extended parallel to the clamping jaws 23 and 24. As a result and as shown on FIG. 2A, it is possible and advantageous to dispose the gripping tool 20 with the body 21 horizontal at the top and the jamb 28 and the clamping jaws 23 and 24 orientated towards the bottom so as to slide the lower extremity 29 of the stop piece 27 under the cable 13 whilst placing the clamping jaws 23 and 24 on both sides of the gripping surface 14. The cable 13 is then firmly supported inside the concavity of the lower extremity 29 and is retained by the jamb 28.

It shall be observed that, according to one advantageous conception, the jamb 28 and the extremity 29 become thinner towards the fork 22 and delimit an eye 70 (through which the cable 13 passes) by a conical wall 71.

However, in this embodiment, the fork is totally secured to the body 21.

The gripping tool 20 also includes a clamp means comprising two clamps 31 disposed laterally and symetrically with respect to the body 21. The clamps 31 comprise support surfaces 32 chucked by the jaws 3. Each of the clamps 31 is connected both to the body 21 and the lengthening piece 27 by means of motion transmitting mechanism 35 composed of three rocker bars 36, 37 and 38. The three rocker bars 36, 37 and 38 are articulated around vertical axes perpendicular to the body 21. The first rocker bar 36 is articulated around a front axis of the clamp 39 and onto a rear axis of a body 40; the second rocker bar 37 is joined onto a rear axis of a clamp 42 and onto a front axis of a body 43; the third rocker bar 38 is joined onto the front axis of a clamp 39 and onto an axis of a stop piece 44 disposed on the bearing 30 of the stop piece 27.

By moving on the gripping tool 20 towards the fork 22, the rear axis of the clamp 42 and the rear axis of the body 40, then the front axis of the body 43, the front axis of the clamp 39 and the stop piece axis 44 successively appear. The first rocker bar 36 is thus intersected with the second and third rocker bars 37 and 38. It is also the one with the largest length: about double or triple.

So as to increase the sturdiness of the assembly, it is also possible to multiply these rocker bars 36, 37 and 38, for example by doubling them and placing them parallel on both sides of the clamps 31 and the body 21. This is shown on FIG. 2A where the additional rocker bars 36', 37' and 38' exactly follow the displacements of the respective associated rocker bars 36, 37 and 38.

The gripping tool 20 is activated by the jaws 3, which press the clamps 31 and bring them closer to one another, which drives the rotation of the rocker bars 36, 37 and 38 (and possibly 36', 37' and 38') until the clamps 31 assume the position shown by the dashes on FIG. 1, namely a position closer to the body 21. The rocker bars 36, 37 and 38 thus assume a position more parallel to the body 21, which means that the bearing 30 is moved and draws stop piece 27 and fork 22 closer together. The stop piece 27 enters into contact with the rear extremity 12 of the plug 12 and pushes it towards the front to the left on the drawings) until the rear shoulder 16 contacts and stops against the fork 22. The fork 22 and the stop piece 27 then clamp the plug 10 between the rear shoulder 16 and the rear extremity 12.

In the case where the eye 70 is delimited by a conical wall 71, the corresponding extremity of the plug 10 preferably may be clamped and centered by being pressed onto this conical wall 71 However, the extremity 12 may also be pressed onto a flat wall 72 of the lengthening piece 27.

Provided the jaw 3 is kept clamped, the plug 12 may thus be lifted up and handled in order to be finally plugged by inserting the front extremity 11 into the fixing connector (not shown). Polarization of the plug 10, namely its rotation around its axis X, is effected by simply pivoting the clip 1. The direction of the plugging-in force is solely longitudinal and only involve highly reduced overhangs. Moreover, the parts of the plug 10, which receive the clamping and plugging-in force, are orientated normally to the displacement direction: they are thus not subjected to friction which would be likely to damage them or the oblique forces which could result in a partial turning round of the plug 10 when being handled.

When plugging in has been carried out, the jaws 3 are separated from the clamps 31; a recall device composed, for example, of a longitudinal spring, placed like the spring 52 of FIGS. 3A and 3B to be described subsequently, or a transversal spring 45 (FIG. 1) disposed between the clamps 31 and body 21, then brings the gripping tool 20 to its initial state in which the clamps 31 are distanced and the stop piece 27 is brought back to the rear, which frees the plug 10 and finally allows the gripping tool 20 to be removed.

Figure 3A:
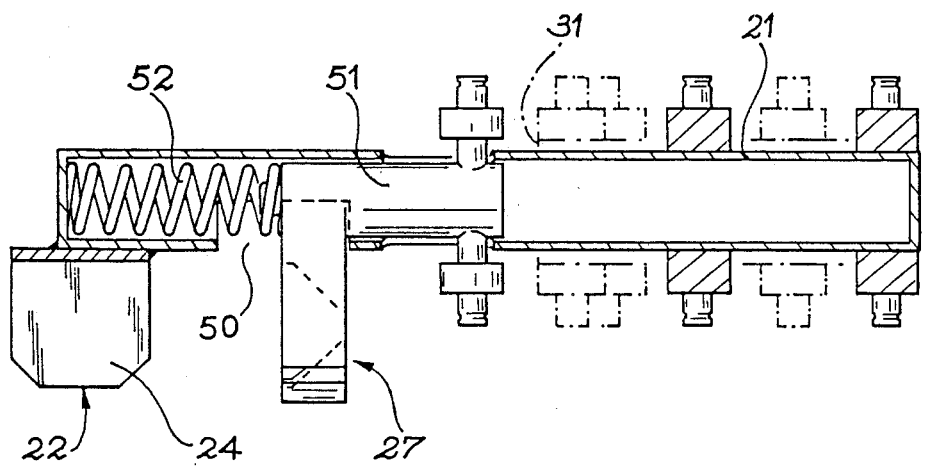
FIGS. 3A and 3B are respectively a top view and a side view of a second equivalent embodiment of the invention.
Figure 3B:
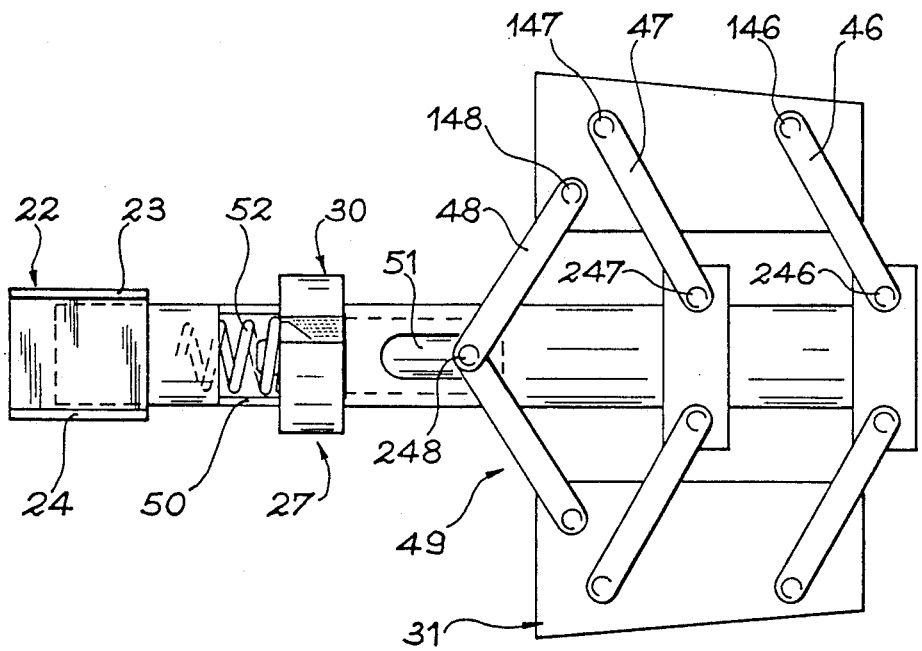

In one slightly different diagrammatic embodiment shown on FIGS. 3A and 3B, the mechanism 35 with the rocker bars 36, 37 and 38 (and possible 36', 37' and 38') is replaced by another mechanism 49 with rocker bars 46, 47 and 48 disposed slightly differently. Two rocker bars 46 and 47 are of the same length and are parallel and are joined onto a clamp 31 and the body 21 around the axes situated along parallel lines so that, as for the jaws 3 of the clip 1, the chucking of the clamps 31 moves the latter without turning them. In this embodiment, the hinge pin 146 or 147 of each rocker bar 46 or 47 situated on the body 21 is at the rear of the hinge pin 246 or 247 situated on the clamp 31 so that chucking moves the clamps 31 towards the front.

A third rocker bar 48, situated downstream of the two others 46 and 47, is joined onto a rear axis 148 on a clamp 31 and onto a front axis 248 on the stop piece 27. It shall be observed that slight intense clamping exerts here a significant displacement on the stop piece 27, which distinguishes this embodiment from the previous one.

Finally, the body 21 is hollow and has an opening 50 on one part of its circumference along the stroke length provided for the bearing 30. The bearing 30 is then provided with a bearing area 51 which slides into the opening 50 and into the interior of the body 21 and which serves as a stop with helical compression spring 52 used as a recall device and which is housed inside the body 21 parallel to its axis and in front of the bearing area 51.

Figure 4A:
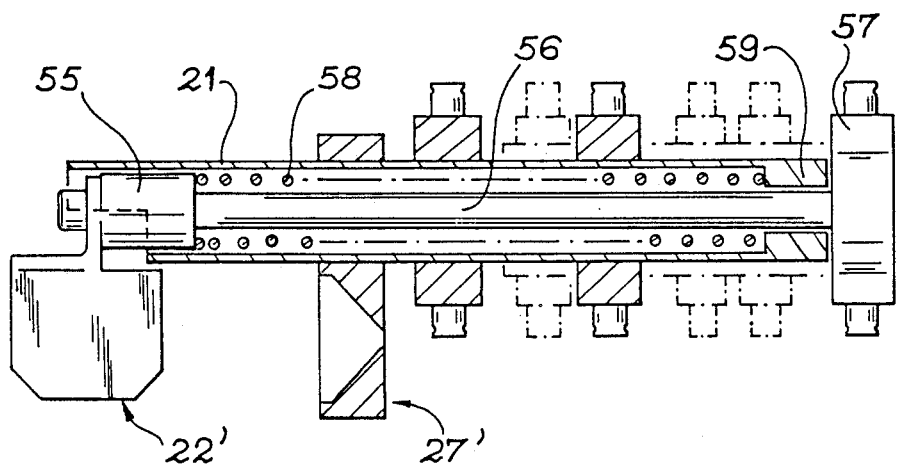
FIGS. 4A and 4B are respectively a top view and a side view of a third equivalent embodiment.
Figure 4B:
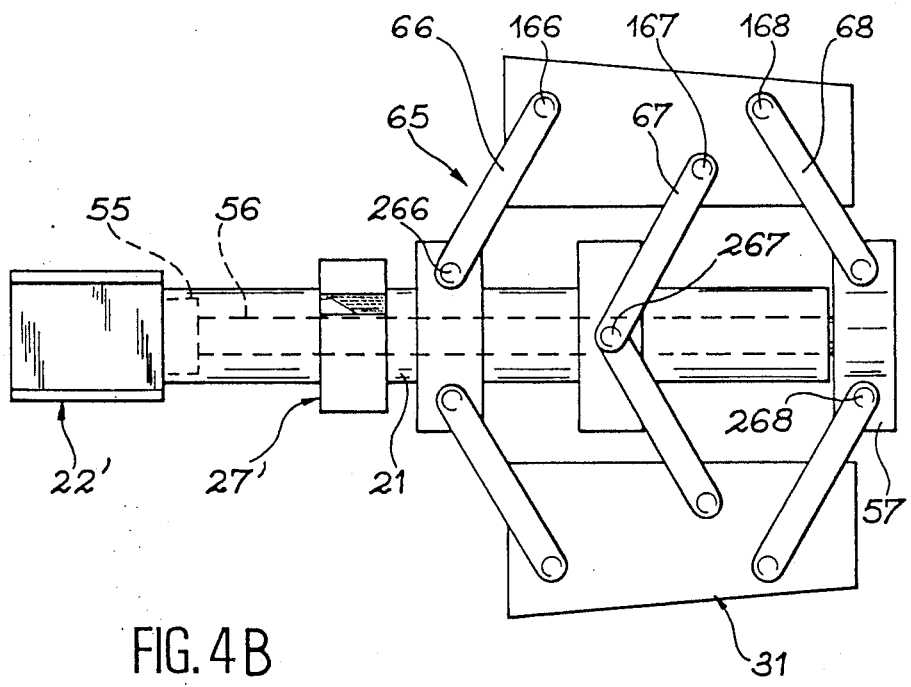

A further equivalent embodiment is described, as shown on FIGS. 4A and 4B. In this embodiment, the stop piece 27' is secured to the body 21 and it is the fork 22' which is mobile.

In effect, it is secured to a cylinder 55 which slides into the body 21, which is hollow, as in the previous embodiment. A rod 56 is placed inside the body 21 and connects the cylinder 55 to a bearing area 57 which projects to the rear of the body 21. A helical compression spring 58 is also used as a recall device; it is placed around the rod 56 and is compressed between the cylinder 55 and a shoulder 59 at the rear of the body 21.

There is also a three rocker bar mechanism 65 for each clamp 31. Two rocker bars 66 and 67 are roughly parallel and joined at their extremities to the body 21 and the clamp 31. For each rocker bar 66 or 67, the hinge pin 266 or 267 on the body 21 is downstream of the hinge pin 166 or 167 on the clamp 31. A third rocker bar 68 is joined at its front extremity 168 to a clamp 31 and at its rear extremity 268 to the bearing area 57. The chucking of the clamp 31 is thus accompanied by a displacement towards the rear, which also communicates a displacement towards the rear at the bearing area 57 and the fork 22'. The compression spring 58 brings the fork 22' back to its initial position at the end of clamping.

The tool according to the invention thus makes it possible, very clearly from the ergonomic point of view, to perfect the process for the remote handling of parts, such as electric plugs or hydraulic or pneumatic connections whose plugging-in is effected by translation.

What is claimed is:

1. A gripping tool for gripping a movable part such as a cable connector plug having a surface (14), a bearing surface (12), a longitudinal axis (X), and a shoulder (16) transverse to said axis; said tool being of the type actuatable by a romote handling device that includes jaws (3) movable toward and away from each other, said tool comprising:
    a support body (21) having a longitudinal extent;
    a fork (22, 22') dimensioned to overlap said surface on opposite sides of said longitudinal axis and having a gripping portion contactable in use with said transverse shoulder of said movable part;
    a stop piece (27, 27') having a portion contactable with said bearing surface;
    said fork and said stop piece mounted on said support body for reciprocal movement toward and away from each other parallel to said axis;
    clamp means (31) having laterally spaced apart portions for receiving said support body therebetween, said clamp means being contactable by and movable toward each other from an open unclamped position to a clamped position by said jaws of said remote handling device during use; and motion transmitting mechanisms (35, 49, 65) connected between said clamp means, said body and said stop piece, to cause said stop piece and fork to move along said longitudinal extent of said support body toward each other, in response to said clamp means being moved to said clamped position during use, to cause said fork gripping portion to abut against said transverse shoulder and apply a compressive clamping force thereto parallel to said longitudinal axis of said movable part to enable said tool to grip and tightly hold said movable part between said fork gripping portion and said stop piece for multidirectional maneuvering.

2. A gripping tool according to claim 1 where said tool includes a recall device (45, 52 or 58) for moving said clamp means to said open unclamped position.

3. A gripping tool according to claim 2 wherein said recall device comprises a biasing means (45) mounted in said mechanism for urging said mechanism to move said clamp means to said open unclamped position.

4. A gripping tool according to claim 1 wherein said stop piece (27) is mounted on said support body (21) for sliding movement longitudinally thereof toward and away from said fork.

5. A gripping tool according to claim 4 wherein said support body (21) has an outer periphery and said stop piece (27) includes a bearing portion (30) slidably mounted on said outer periphery of said support body.

6. A gripping tool according to claim 1 wherein said stop piece includes a vertical jamb (28) projecting laterally from said support body, said jamb having a lower extremity in the form of a hook adapted to engage and support a cable connected to said movable part.

7. A gripping tool according to claim 1 wherein said mechanisms include first and second rocker bars (36) pivotally interconnecting said support body with said clamp means, and a third rocker bar means (38) pivotally interconnecting said clamp means with said stop piece.

8. A gripping tool according to claim 1 wherein said portion of said stop piece that contacts said bearing surface includes a conical wall for contacting and centering said bearing surface of the movable part when said tool is in use.

9. A gripping tool according to claim 1 wherein said fork (22) is mounted on said support body for sliding movement longitudinally toward and away from said stop piece (27).

10. A gripping tool according to claim 9 wherein
    said support body (51) includes an external bearing area;
    said stop piece is fixedly mounted on said support body; and
    said fork has a hollow sleeve slidably mounted on said external bearing area, said hollow sleeve having an opening (50) through which said stop piece projects.

11. A gripping tool according to claim 10 wherein said tool includes a recall device (52) for moving said clamp means to said open unclamped position.

12. A gripping tool according to claim 9 wherein:
    said support body has a hollow portion;
    said stop piece (27') is fixedly mounted on said support body; and
    said fork includes a rod means (56) slidably mounted in said hollow portion.

13. A gripping tool according to claim 12 wherein said recall device comprises a compression spring (58) mounted between said support body and said fork in surrounding relation to said rod means.

* * * * *